(12) United States Patent
Date (10) Patent No.: US 12,122,351 B2
(45) Date of Patent: Oct. 22, 2024

(54) VEHICLE AND VEHICLE OPERATION SYSTEM

(71) Applicant: TOYOTA JIDOSHA KABUSHIKI KAISHA, Toyota Aichi-ken (JP)

(72) Inventor: Chihiro Date, Kariya Aichi-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 318 days.

(21) Appl. No.: 17/578,912

(22) Filed: Jan. 19, 2022

(65) Prior Publication Data

US 2022/0306071 A1    Sep. 29, 2022

(30) Foreign Application Priority Data

Mar. 26, 2021   (JP) ................... 2021-052519

(51) Int. Cl.
*B60W 10/30*   (2006.01)
*A61G 3/06*    (2006.01)
(Continued)

(52) U.S. Cl.
CPC ............. *B60W 10/30* (2013.01); *A61G 3/061* (2013.01); *B60P 1/431* (2013.01); *B60R 25/24* (2013.01); *B60W 60/00253* (2020.02); *E05F 15/76* (2015.01); *G06Q 10/02* (2013.01); *G06V 20/58* (2022.01); *E05F 2015/767* (2015.01); *E05Y 2201/434* (2013.01); *E05Y 2400/40* (2013.01); *E05Y 2400/44* (2013.01); *E05Y 2400/454* (2013.01); *E05Y 2800/10* (2013.01); *E05Y 2900/531* (2013.01)

(58) Field of Classification Search
CPC . B60W 10/30; B60W 60/00253; A61G 3/061; B60R 25/24; G06Q 10/02; G06V 20/58
See application file for complete search history.

(56) References Cited

U.S. PATENT DOCUMENTS

| | | | |
|---|---|---|---|
| 8,104,128 B2* | 1/2012 | Kawaguchi | A61G 3/061 14/71.3 |
| 10,853,629 B2* | 12/2020 | Blanc-Paques | G06V 10/95 |

(Continued)

FOREIGN PATENT DOCUMENTS

| | | | | |
|---|---|---|---|---|
| CN | 112150850 A | * | 12/2020 | G06Q 10/02 |
| CN | 112749817 A | * | 5/2021 | G06N 20/00 |

(Continued)

*Primary Examiner* — Jelani A Smith
*Assistant Examiner* — Nada Mahyoob Alqaderi
(74) *Attorney, Agent, or Firm* — Dinsmore & Shohl LLP (57) ABSTRACT

A vehicle includes a slope device configured to perform deployment and storage of a slope, a camera, and a door and slope control device configured to communicate with a server including a getting-on reservation database including attribute information of a passenger, and perform deployment and storage of the slope by the slope device, in which the door and slope control device is configured to, when the vehicle is stopped to allow the passenger to get on the vehicle, confirm the attribute information of the passenger acquired from the getting-on reservation database of the server based on an image of the passenger captured by the camera, and perform deployment of the slope depending on the confirmed attribute information.

12 Claims, 7 Drawing Sheets

(51) Int. Cl.
  *B60P 1/43* (2006.01)
  *B60R 25/24* (2013.01)
  *B60W 60/00* (2020.01)
  *E05F 15/76* (2015.01)
  *G06Q 10/02* (2012.01)
  *G06V 20/58* (2022.01)
  *E05F 15/73* (2015.01)

(56) References Cited

U.S. PATENT DOCUMENTS

| | | | |
|---|---|---|---|
| 10,891,051 B2 * | 1/2021 | Klein | G06F 1/1692 |
| 2019/0193620 A1 * | 6/2019 | Matsuoka | B60K 7/0007 |
| 2020/0104770 A1 * | 4/2020 | Aich | B60N 2/245 |
| 2020/0262326 A1 * | 8/2020 | Honda | B60N 2/0292 |
| 2020/0320814 A1 * | 10/2020 | Hastings | G07C 9/257 |
| 2021/0150434 A1 * | 5/2021 | Keen | G06Q 10/06311 |
| 2021/0209713 A1 * | 7/2021 | Imtiyaz | G06Q 50/40 |
| 2021/0245650 A1 * | 8/2021 | Tomioka | B60P 1/431 |
| 2022/0089237 A1 * | 3/2022 | Sverdlov | B25J 9/1697 |
| 2022/0126641 A1 * | 4/2022 | Oya | B60P 1/433 |
| 2022/0332240 A1 * | 10/2022 | Fukuta | B60P 1/431 |

FOREIGN PATENT DOCUMENTS

| | | | |
|---|---|---|---|
| EP | 3865105 A1 * | 8/2021 | A61G 3/06 |
| JP | 2019-020985 A | 2/2019 | |
| JP | 2019-116112 A | 7/2019 | |
| JP | 2021-126957 A | 9/2021 | |

* cited by examiner

GETTING-ON RESERVATION DATABASE — 55

| NAME OF PASSENGER | ATTRIBUTE INFORMATION OF PASSENGER ||||| RESERVATION INFORMATION |||| GETTING-ON SCHEDULED VEHICLE NUMBER |
| --- | --- | --- | --- | --- | --- | --- | --- | --- | --- | --- |
| | REGISTERED PORTABLE TERMINAL INFORMATION | USE OF WHEELCHAIR | VOICE GUIDE | | | GETTING-ON DATE | GETTING-ON TIME | GETTING-ON LOCATION | | |
| AAAA | 1122334455 | USE | NEEDED | | ... | APRIL 10, 2020 | 10:00 | 1-2, BB TOWN, AA WARD | | 1001 |
| BBBB | 2233445599 | USE | UNNEEDED | | ... | APRIL 10, 2020 | 10:45 | 3-4, EE TOWN, BB WARD | | 1002 |
| CCCC | 3344557711 | NON-USE | UNNEEDED | | ... | APRIL 10, 2020 | 11:15 | BUS STOP IN FRONT OF ○○ STATION | | 1005 |
| ... | ... | ... | ... | | ... | ... | ... | ... | | ... |

VEHICLE AND VEHICLE OPERATION SYSTEM

CROSS-REFERENCE TO RELATED APPLICATION

This application claims priority to Japanese Patent Application No. 2021-052519 filed on Mar. 26, 2021, incorporated herein by reference in its entirety.

BACKGROUND

1. Technical Field

The present disclosure relates to a vehicle that performs opening and closing of a door and opening and closing of a slope depending on an attribute of a passenger, and a vehicle operation system using the vehicle.

2. Description of Related Art

In recent years, in order to improve the ease of getting on and off a shared vehicle by a wheelchair user, a configuration has been proposed in which a slope device is mounted below an entrance of the shared vehicle (see, for example, Japanese Unexamined Patent Application Publication No. 2019-116112 (JP 2019-116112 A)).

In addition, a system that, in a case where a passenger intends to get on an unmanned taxi, can specify the passenger by communicating with a portable terminal of the passenger, detect that the passenger approaches the unmanned taxi, unlock a door of a vehicle, and allow the passenger to get on the vehicle has been proposed (see, for example, Japanese Unexamined Patent Application Publication No. 2019-20985 (JP 2019-20985 A)).

SUMMARY

By the way, in a shared vehicle, in a case of a configuration in which a slope is deployed each time a door is opened, a stop time is long and an operation speed of the shared vehicle is slow. Therefore, it is needed to determine the necessity of deployment of the slope, such as deploying the slope solely when passenger who uses a wheelchair gets on and off. On the other hand, there is an increasing demand for fully autonomous driving of the shared vehicle, but in a case where the shared vehicle is fully autonomously driven, it is needed to determine the necessity of deployment of the slope by a method other than confirmation by a driver or an operator.

Therefore, the present disclosure is to determine the necessity of deployment of the slope by autonomous control in the vehicle.

A first aspect of the present disclosure relates to a vehicle including a slope device, an imaging device, and a control device. The slope device is configured to perform deployment and storage of a slope that forms a getting on-and-off passage of a passenger. The imaging device is configured to capture a status of the passenger before getting on the vehicle. The control device is configured to communicate with a server including a getting-on reservation database including attribute information of the passenger, and perform deployment and storage of the slope by the slope device. The control device is configured to, when the vehicle is stopped to allow the passenger to get on the vehicle, confirm the attribute information of the passenger acquired from the getting-on reservation database of the server based on an image of the passenger before getting on the vehicle captured by the imaging device, and perform deployment of the slope depending on the confirmed attribute information.

As a result, it is possible to determine the necessity of deployment of the slope depending on the attribute information of the passenger by an autonomous control in the vehicle.

In the vehicle according to the first aspect of the present disclosure, the attribute information of the passenger acquired from the getting-on reservation database may include information on use or non-use of a wheelchair when the passenger gets on the vehicle, and the control device may be configured to confirm the information on use or non-use of the wheelchair when the passenger gets on the vehicle acquired from the getting-on reservation database based on the image of the passenger before getting on the vehicle captured by the imaging device, and perform deployment of the slope depending on the confirmed information on use or non-use of the wheelchair when the passenger gets on the vehicle.

As a result, it is possible to perform deployment of the slope depending on the information on use or non-use of the wheelchair by the passenger by the autonomous control.

In the vehicle according to the first aspect of the present disclosure, the control device may be configured to communicate with a portable terminal carried by the passenger when the passenger gets on the vehicle, the attribute information of the passenger acquired from the getting-on reservation database may include information on a registered portable terminal registered in the getting-on reservation database by the passenger, and the control device may be configured to confirm whether or not the passenger is the passenger who makes a getting-on reservation based on information on the portable terminal acquired from the portable terminal carried by the passenger, and the information on the registered portable terminal of the passenger acquired from the getting-on reservation database.

In this way, since deployment of the slope is performed after the confirmation is made as to whether the passenger who intends to get on the vehicle is the passenger who makes the getting-on reservation, it is possible to surely perform deployment of the slope depending on the attribute of the passenger.

In the vehicle according to the first aspect of the present disclosure, the control device may be configured to perform deployment of the slope based on approach information of the portable terminal acquired from the portable terminal carried by the passenger.

As a result, since deployment of the slope is performed at the timing when the passenger approaches the vehicle, it is possible to produce a feeling of hospitality.

A second aspect of the present disclosure relates to a vehicle operation system including a vehicle on which a passenger gets and a server. The vehicle is configured to autonomously travel. The server includes a getting-on reservation database including attribute information of the passenger. The vehicle includes a slope device configured to perform deployment and storage of a slope that forms a getting on-and-off passage of a passenger, an imaging device configured to capture a status of the passenger before getting on the vehicle, and a control device configured to communicate with a server including a getting-on reservation database including attribute information of the passenger, and perform deployment and storage of the slope by the slope device. The control device is configured to, when the vehicle is stopped to allow the passenger to get on the vehicle, confirm the attribute information of the passenger acquired from the getting-on reservation database of the server based on an image of the passenger before getting on the vehicle captured by the imaging device, and perform deployment of the slope depending on the confirmed attribute information.

As a result, it is possible to determine the necessity of deployment of the slope and perform deployment of the slope depending on the attribute information of the passenger by the autonomous control in the vehicle that is autonomous driven.

In the vehicle operation system according to the second aspect of the present disclosure, the attribute information of the passenger stored in the getting-on reservation database may include information on use or non-use of a wheelchair when the passenger gets on the vehicle, and the control device may be configured to confirm the information on use or non-use of the wheelchair when the passenger gets on the vehicle acquired from the getting-on reservation database of the server based on the image of the passenger before getting on the vehicle captured by the imaging device, and perform deployment of the slope depending on the confirmed information on use or non-use of the wheelchair when the passenger gets on the vehicle.

As a result, it is possible to perform deployment of the slope depending on the use or non-use of the wheelchair by the passenger by the autonomous control in the vehicle that is autonomous driven.

The vehicle operation system according to the second aspect of the present disclosure may further include a portable terminal carried by the passenger when the passenger gets on the vehicle, in which the control device is configured to communicate with a portable terminal carried by the passenger when the passenger gets on the vehicle, the attribute information of the passenger stored in the getting-on reservation database includes information on a registered portable terminal registered in the getting-on reservation database by the passenger, and the control device is configured to confirm whether or not the passenger is the passenger who makes a getting-on reservation based on information on the portable terminal acquired from the portable terminal carried by the passenger, and the information on the registered portable terminal of the passenger acquired from the getting-on reservation database.

In this way, since deployment of the slope is performed after the confirmation is made as to whether the passenger who intends to get on the vehicle is the passenger who makes the getting-on reservation, it is possible to surely perform deployment of the slope depending on the attribute of the passenger even in the vehicle that is autonomous driven.

In the vehicle operation system according to the second aspect of the present disclosure, the control device may be configured to perform deployment of the slope based on approach information of the portable terminal acquired from the portable terminal carried by the passenger.

As a result, even in a vehicle that is autonomous driven, deployment of the slope is performed at the timing when the passenger approaches the vehicle, so that it is possible to produce a feeling of hospitality.

According to the present disclosure, it is possible to determine whether or not the slope is deployed by autonomous control in the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
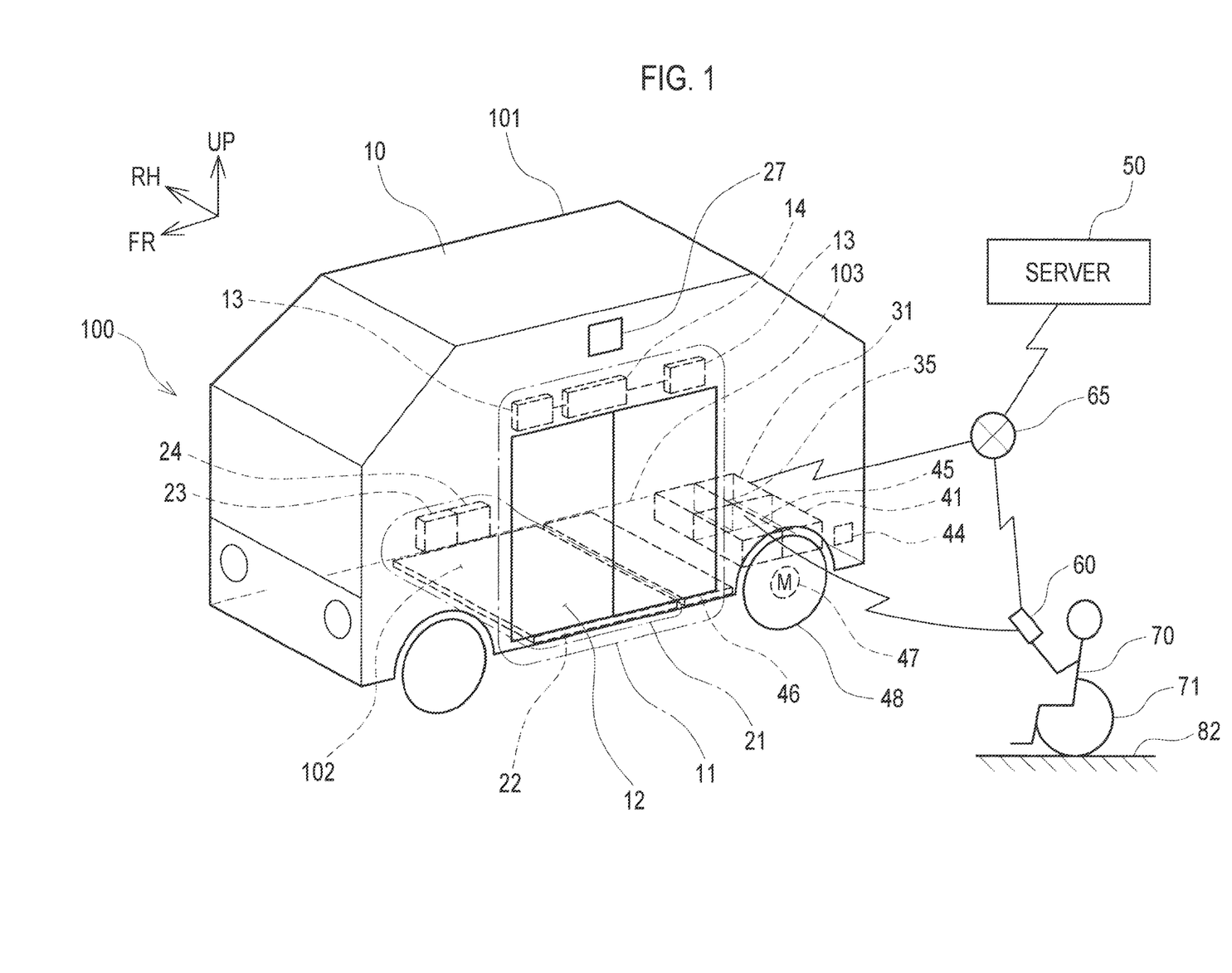
FIG. 1 is a perspective view showing a vehicle used in a vehicle operation system according to an embodiment, in which a door is closed and a slope is stored.

In the following, a vehicle operation system 100 according to an embodiment will be described with reference to the drawings. Note that an arrow FR, an arrow UP, and an arrow RH shown in each drawing indicate a front direction (traveling direction), an upper direction, and a right direction of the vehicle 10, respectively. In addition, the opposite directions of the arrow FR, the arrow UP, and the arrow RH indicate a vehicle rear direction, a lower direction, and a left direction, respectively. In the following, in a case where the description is made by using simply the front-rear, right-left, upper-lower directions, unless otherwise specified, the front-rear, right-left, upper-lower directions shall indicate the front and rear of the front-rear direction of the vehicle, the right and left of the right-left direction of the vehicle (width direction of the vehicle), and the up and down of the upper-lower direction of the vehicle, respectively. As shown in FIG. 1, the vehicle operation system 100 is configured by a vehicle 10, a server 50, and a portable terminal 60 carried by a passenger 70. Note that the number of the vehicles 10 may be plural, but solely one vehicle 10 is displayed in the drawings, and the other vehicles 10 are not shown. Note that FIG. 1 shows a state in which a door 12 of the vehicle 10 is closed and a slope 22 is stored.

The vehicle 10 is an electric vehicle capable of autonomously traveling by autonomous driving. As shown in FIG. 1, the vehicle 10 includes a body 101, a door device 11, a slope device 21, a camera 27 that is an imaging device, a communication device 35, a door and slope control device 31, a travel control device 41, a position detection device 45, a sensor 44, a battery 46, a driving motor 47, and wheels 48.

The body 101 is symmetrical in the front-rear direction and has a vehicle cabin 102 on which the passenger 70 gets on. A floor 103 of the vehicle cabin 102 is flat, and, a seat (not shown) on which the passenger 70 sits is disposed in the vehicle cabin 102.

The door device 11 is configured by a double door 12 provided on a side surface of the body 101 and sliding along the side surface of the body 101, a motor 13 that opens and closes the door 12, and a controller 14 that controls an operation of the motor 13.

The slope device 21 is provided on a lower side of the floor 103 of the body 101. The slope device 21 is configured by the slope 22 that is deployed toward an outside of the body 101 in the width direction of the vehicle, a motor 23 that performs deployment and storage of the slope 22, and a controller 24 that performs control of the motor 23.

The camera 27 is attached to the side surface of the body 101 above the door 12 and captures a status of the passenger 70 before getting on the vehicle outside the door 12 of the vehicle 10.

The communication device 35, the door and slope control device 31, the travel control device 41, the sensor 44, and the position detection device 45 are disposed inside the body 101. The battery 46 is disposed next to the slope device 21 below the floor 103. The driving motor 47 of the vehicle 10 is an in-wheel motor built inside the wheels 48. Note that a configuration may be adopted in which the driving motor 47 is not the in-wheel motor and mounted on the body 101 to drive the wheels 48.

Figure 2:
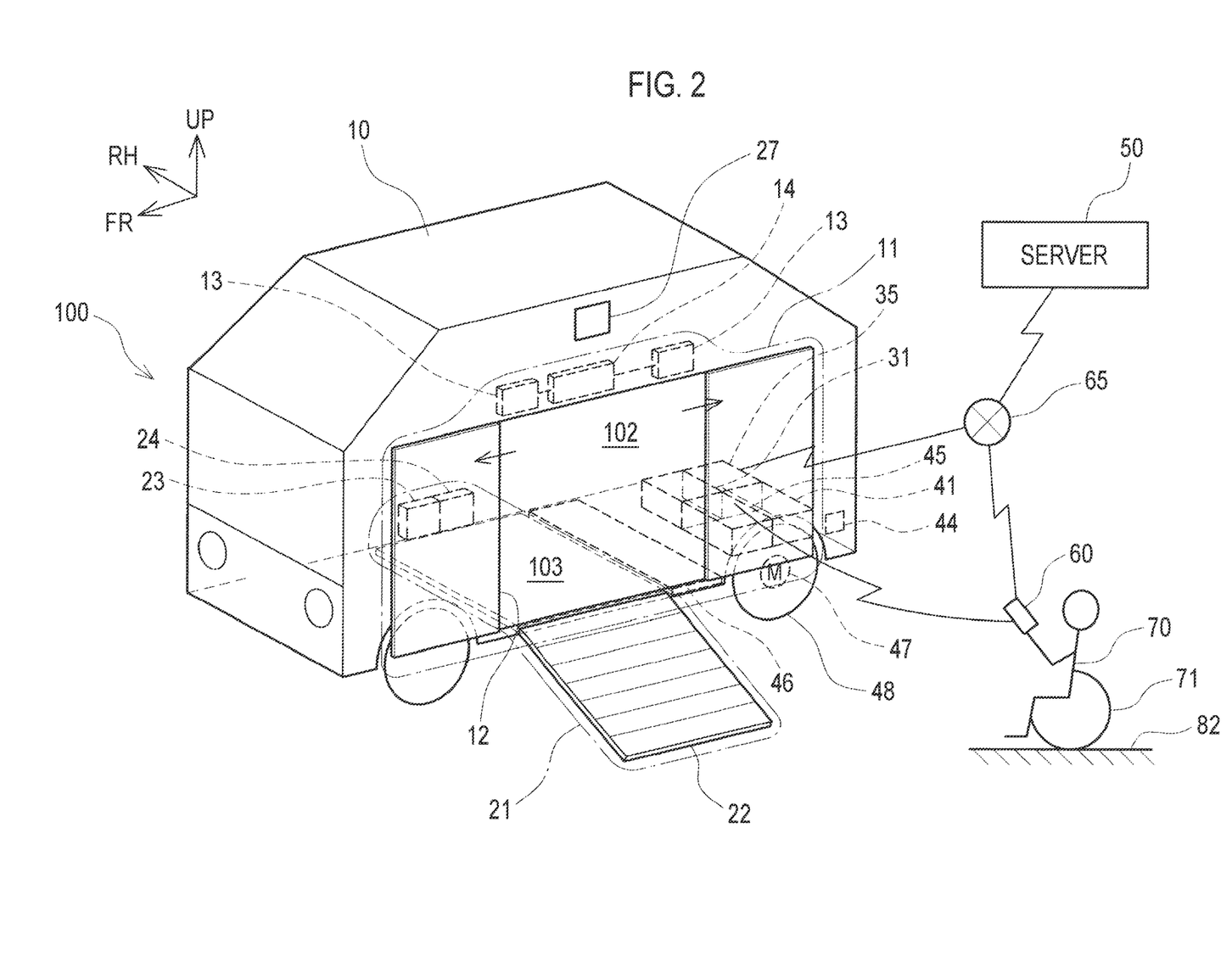
FIG. 2 is a perspective view showing a state in which the door of the vehicle shown in FIG. 1 is opened and the slope is deployed.
Figure 3:
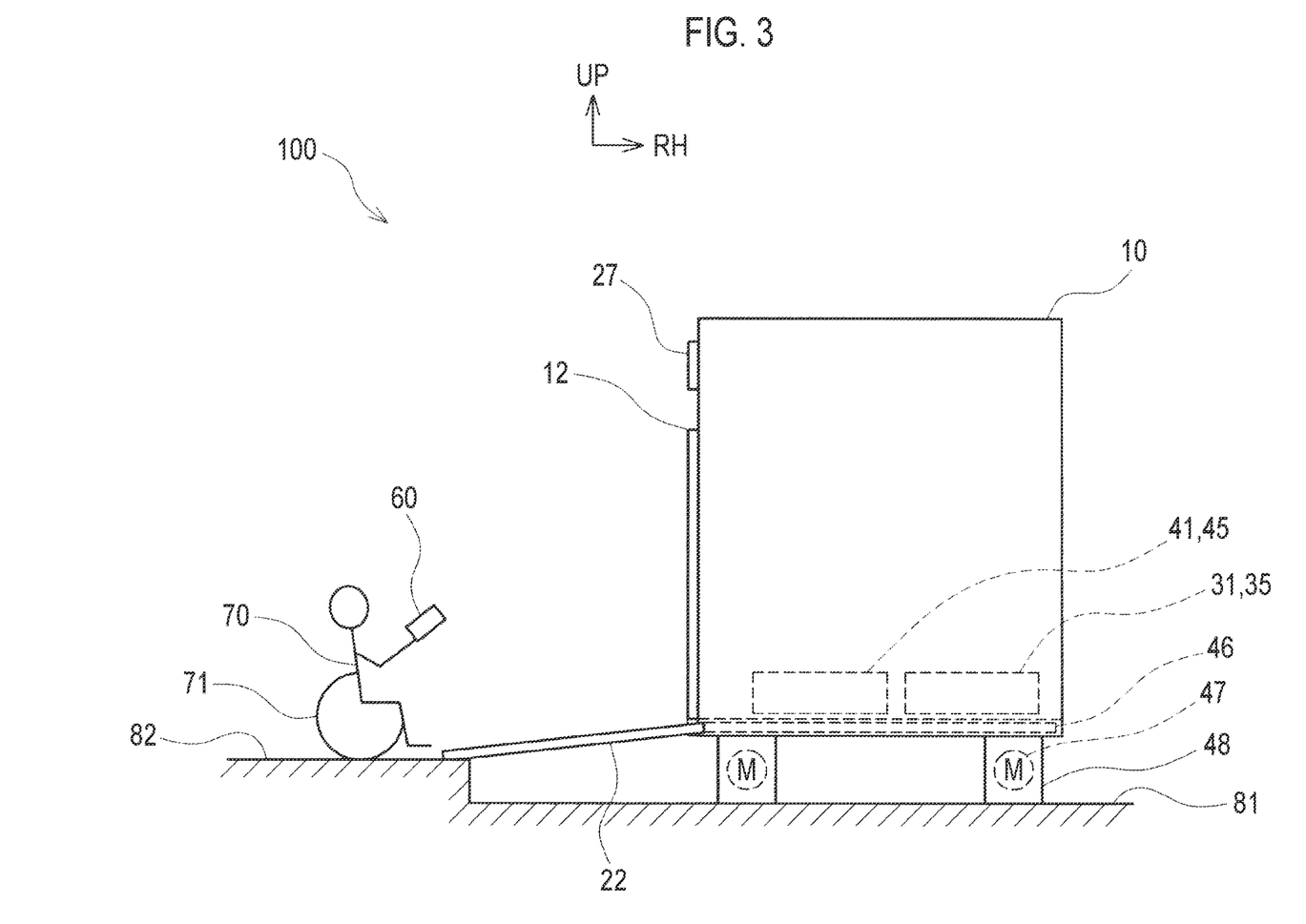
FIG. 3 is an elevation view showing a state in which the door of the vehicle shown in FIG. 1 is opened, the slope is deployed, and a passenger approaches the vehicle.

As shown in FIG. 2, when the vehicle 10 is stopped and the passenger 70 gets on and off, the door device 11 opens the door 12 for getting-on and getting-off of the passenger 70. When the door 12 is opened, the flat vehicle cabin 102 appears. In addition, when the vehicle 10 is stopped and the door 12 is opened, the slope device 21 deploys the slope 22 toward the outside of the body 101 in the width direction of the vehicle. As shown in FIG. 3, the deployed slope 22 has a distal end that is in contact with a sidewalk 82, and forms a getting on-and-off passage for passenger 70 who sits on a wheelchair 71 on the sidewalk 82 to the floor 103 of the vehicle 10. In addition, the camera 27 captures the status of the passenger 70 on the sidewalk 82 before getting on the vehicle. Note that in a case where the passenger 70 is on a side of a roadway 81, the slope device 21 deploys the slope 22 such that the distal end of the slope 22 is in contact with the roadway 81.

Figure 4:
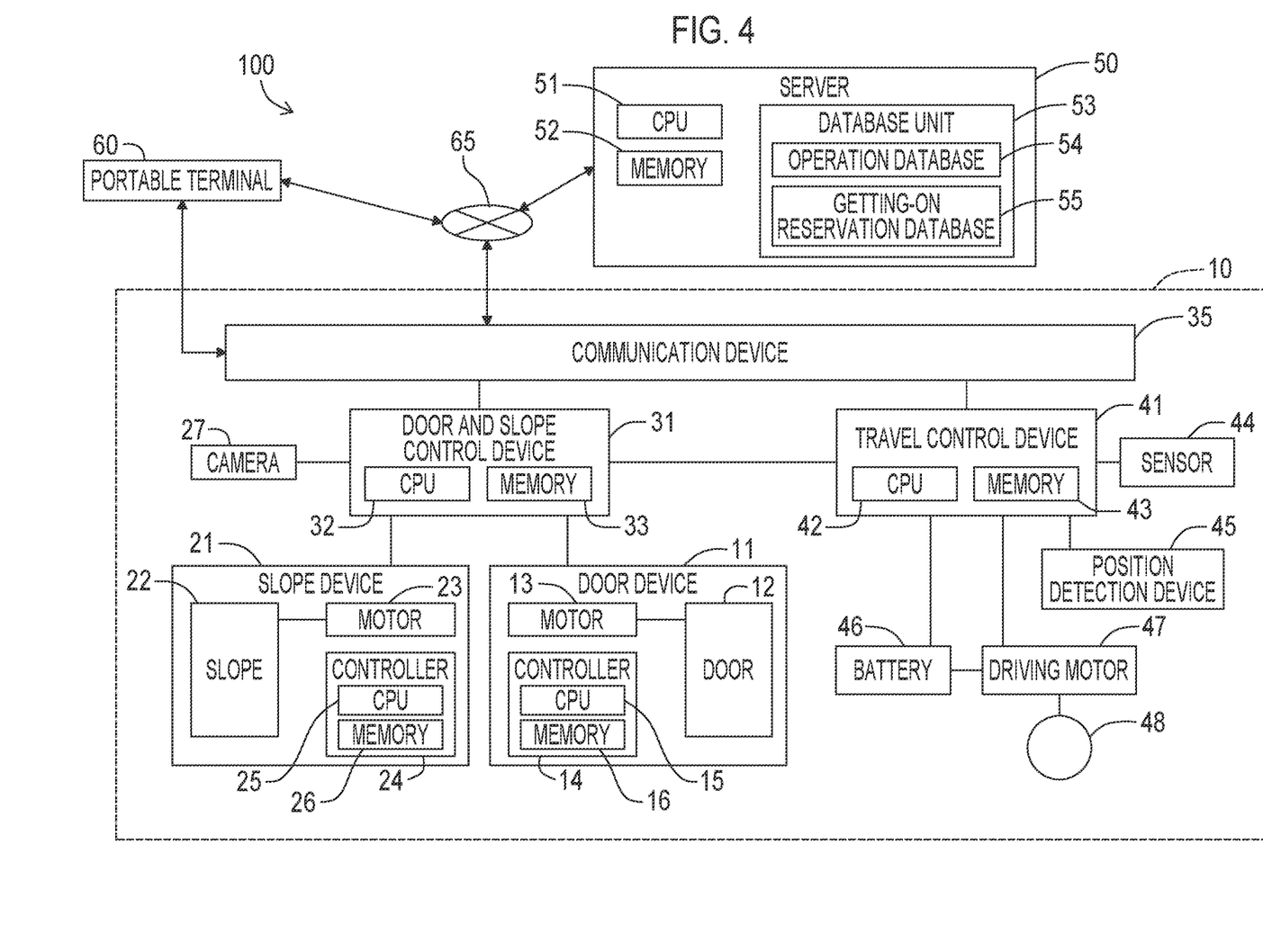
FIG. 4 is a functional block diagram showing a configuration of the vehicle operation system according to the embodiment.

As shown in FIG. 4, the door device 11 and the slope device 21 are connected to the door and slope control device 31, and perform opening and closing of the door 12 and deployment and storage of the slope 22 based on a command of the door and slope control device 31. In addition, the camera 27 is connected to the door and slope control device 31, and image data captured by the camera 27 is input to the door and slope control device 31. The door and slope control device 31 is connected to the communication device 35. The communication device 35 communicates with the server 50 via an external communication line 65 to perform exchange of data with the server 50. In addition, the communication device 35 communicates with the portable terminal 60 carried by the passenger 70 to acquire approach information of the portable terminal 60. Therefore, the door and slope control device 31 communicates with the server 50 via the communication device 35 and the communication line 65 to exchange the data, and communicates with the portable terminal 60 carried by the passenger 70 via the communication device 35 to perform exchange of data. In addition, the portable terminal 60 carried by the passenger 70 communicates with the server 50 via the communication line 65, and performs exchange of data with the server 50. Here, for example, the communication line 65 may be the Internet or a telephone communication line.

The driving motor 47 of the vehicle 10, the battery 46, the sensors 44, such as an acceleration sensor and a speed sensor mounted on the vehicle 10, and the position detection device 45 having a built-in GPS device to detect a travel position of the vehicle 10 are connected to the travel control device 41. The driving motor 47 and the battery 46 are operated in response to a command of the travel control device 41. In addition, data, such as acceleration and speed, detected by the sensor 44 is input to the travel control device 41. In addition, position data of the vehicle 10 detected by the position detection device 45 is also input to the travel control device 41. In addition, the travel control device 41 is connected to the communication device 35, communicates with the server 50 via the communication device 35 and the communication line 65, and performs exchange of data with the server 50.

The controller 14 of the door device 11 is configured by a computer including a CPU 15 that is a processor that performs information processing and a memory 16 that stores an operation program or control data. Similarly, the controller 24 of the slope device 21 is also configured by a computer including a CPU 25 that is a processor that performs information processing and a memory 26 that stores an operation program or control data. In addition, similarly, the door and slope control device 31 and the travel control device 41 are configured by computers including CPUs 32, 42 that are processors that perform information processing and memories 33, 43.

The server 50 is configured by a computer including a CPU 51 that is a processor that performs information processing and a memory 52 that stores an operation program and the like, and is connected to a database unit 53 that stores a large amount of data. The database unit 53 stores an operation database 54 to be referred to when operation control of the vehicle 10 is performed and a getting-on reservation database 55 that stores getting-on reservation data registered by the passenger 70. For example, the database unit 53 may be configured by a hard disk or an external memory device.

Figure 5:
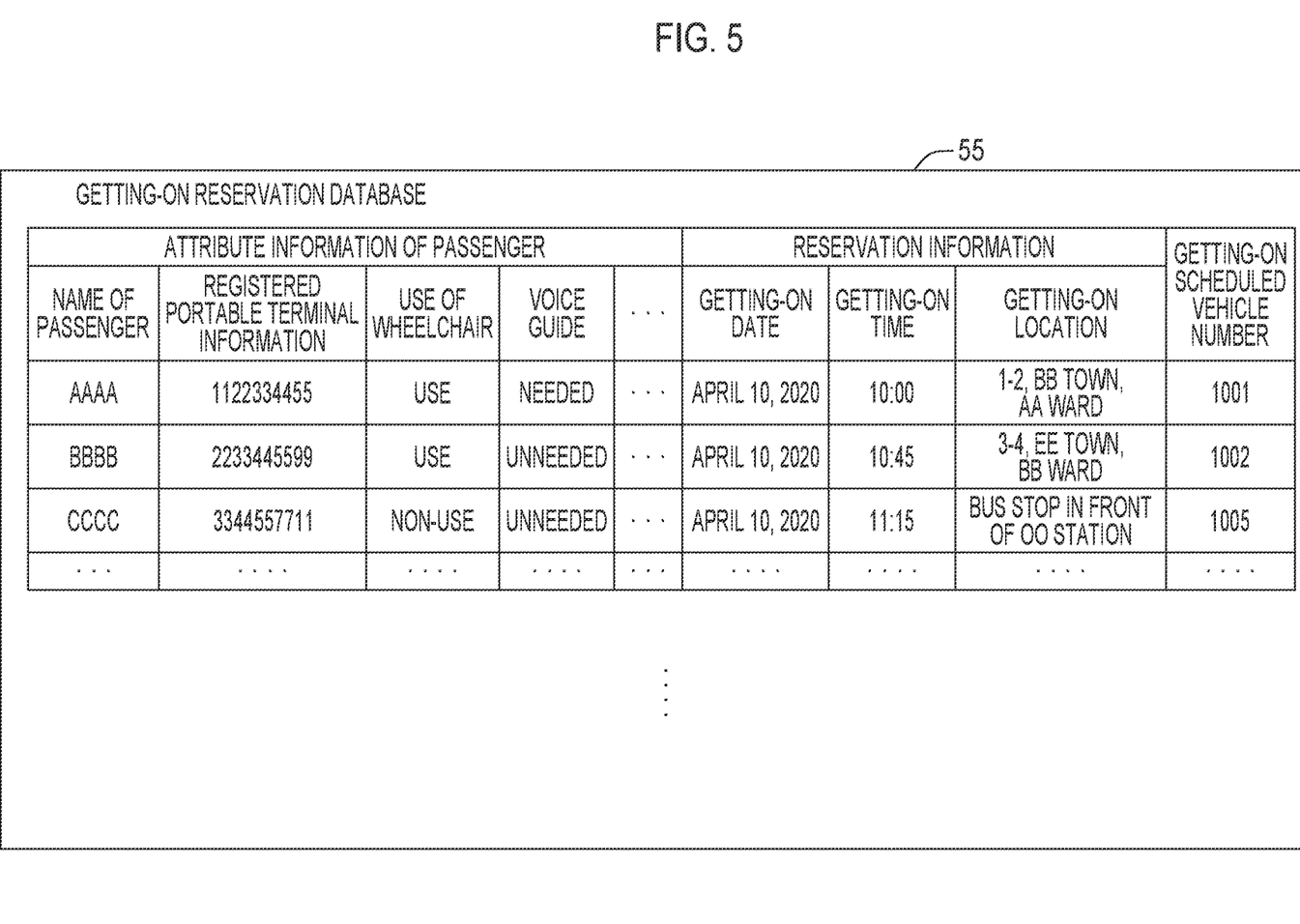
FIG. 5 is a table showing a data structure of a getting-on reservation database shown in FIG. 4.

As shown in FIG. 5, the getting-on reservation database 55 stores a name of the passenger 70 registered when the passenger 70 makes a reservation by the portable terminal 60, registered portable terminal information, attribute information of the passenger 70, such as the use or non-use of the wheelchair 71 in a case of getting on and off the vehicle and the necessity of voice guide, reservation information including getting-on date, getting-on time, and getting-on location, and a getting-on scheduled vehicle number decided based on the reservation information by the server 50 in association with each other. In the getting-on reservation database 55 shown in FIG. 5, two requirements for getting on and off the vehicle are shown, that is, the use or non-use of the wheelchair 71 and the necessity of the voice guide, but the present disclosure is not limited thereto. For example, an item, such as the necessity of a caregiver, may be stored. In addition, the registered portable terminal information may be, for example, a telephone number of the portable terminal 60 carried by the passenger 70, or another information for specifying the portable terminal 60.

In addition, the operation database 54 stores vehicle allocation information, such as a travel route and a stop location of a plurality of the vehicles 10. Note that the database unit 53 may include a database, such as a map or detailed information on the travel route, in addition to these databases 54 and 55.

Next, an operation of the vehicle operation system 100 will be described with reference to FIGS. 6 and 7. As shown in step S101 of FIG. 6, when the passenger 70 makes the getting-on reservation by the portable terminal 60 by inputting the name of the passenger 70, the registered portable terminal information, the attribute information of the passenger, such as the use or non-use of the wheelchair 71 in a case of getting on and off the vehicle and the necessity of voice guide, the reservation information including getting-on date, the getting-on time, and the getting-on location, these pieces of information are registered in the getting-on reservation database 55 as shown in FIG. 5.

Figure 6:
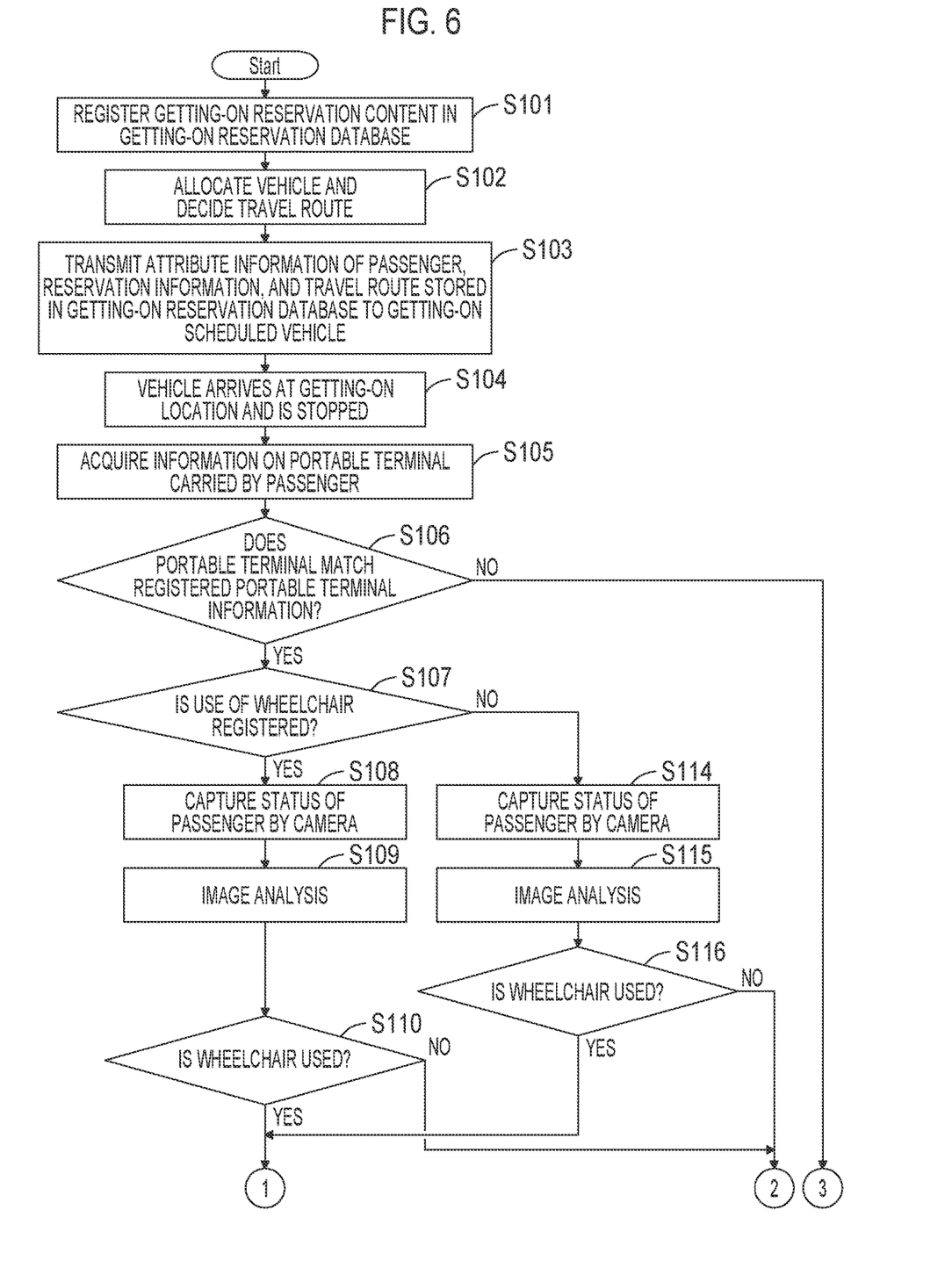
FIG. 6 is a flowchart showing an operation of the vehicle shown in FIG. 1.

When the passenger 70 registers the getting-on reservation, the server 50 performs vehicle allocation of the vehicle 10 and decision of the travel route based on the reservation information as shown in step S102 of FIG. 6, and registers the getting-on scheduled vehicle number of the passenger 70 in the getting-on reservation database. Moreover, in step S103 of FIG. 6, the server 50 transmits the attribute information of the passenger 70 to the vehicle 10 on which the passenger 70 is scheduled to get. The door and slope control device 31 of the vehicle 10 acquires the attribute information of the passenger 70 via the communication line 65 and the communication device 35 and stores the acquired attribute information in the memory 33. In addition, the server 50 transmits the reservation information and the information on the travel route to the vehicle 10. The travel control device 41 of the vehicle 10 stores the reservation information and the information on the travel route in the memory 43.

The CPU 42 of the travel control device 41 causes the vehicle 10 to autonomously travel by autonomous driving along the travel route stored in the memory 43 based on position information of the vehicle 10 acquired by the position detection device 45 and travel state information of the vehicle 10 acquired by the sensor 44. Moreover, as shown in step S104 of FIG. 6, when the vehicle 10 arrives at the registered getting-on location, the CPU 42 of the travel control device 41 stops the vehicle 10 to allow the passenger 70 to get on the vehicle. When the vehicle 10 is stopped, the CPU 42 outputs, to the door and slope control device 31, signals indicating that the vehicle 10 arrives at the getting-on location of the passenger 70 and is stopped.

When the signals indicating the vehicle 10 arrives at the getting-on location and is stopped are input from the travel control device 41, as shown in step S105 of FIG. 6, the CPU 32 of the door and slope control device 31 communicates with the portable terminal 60 carried by the passenger 70 via the communication device 35 and acquires the portable terminal information of the portable terminal 60 carried by the passenger 70. Moreover, as shown in step S106 of FIG. 6, the CPU 32 determines whether or not the acquired portable terminal information matches the registered portable terminal information stored in the memory 33. Moreover, in a case where the determination is made as YES in step S106 of FIG. 6, the CPU 32 determines that the passenger who waits for getting on the vehicle at the getting-on location is the passenger 70 who makes the getting-on reservation, and proceeds to step S107 of FIG. 6. On the other hand, in a case where the determination is made as NO in step S106 of FIG. 6, the CPU 32 determines that the passenger who waits for getting on the vehicle at the getting-on location is not the passenger 70 who makes the getting-on reservation, and terminates the process.

The CPU 32 reads out the attribute information of the passenger 70 stored in the memory 33 in step S107 of FIG. 6 and confirms whether or not the use of the wheelchair 71 is registered. Then, in a case where the determination is made as YES in step S107 of FIG. 6, the CPU 32 proceeds to step S108 of FIG. 6.

In step S108 of FIG. 6, the CPU 32 captures an image of the passenger 70 on the sidewalk 82 on the side of the door 12 by the camera 27 as shown in FIG. 3, and stores the captured image data in the memory 33. Moreover, in step S109 of FIG. 6, the CPU 32 performs image analysis of the image acquired in step S108 to confirm whether or not the passenger 70 sits on the wheelchair 71. In a case where the CPU 32 determines that the passenger 70 uses the wheelchair 71 as a result of the image analysis, the attribute information of the passenger 70 that the wheelchair 71 is used is confirmed, and the CPU 32 determines that the slope 22 needs to be deployed. Moreover, the CPU 32 makes the determination as YES in step S110 of FIG. 6, proceeds to step S111 of FIG. 7, and communicates with the portable terminal 60 carried by the passenger 70 via the communication device 35 to acquire the approach information of the portable terminal 60. The acquisition of this approach information may be performed by approach communication.

Figure 7:
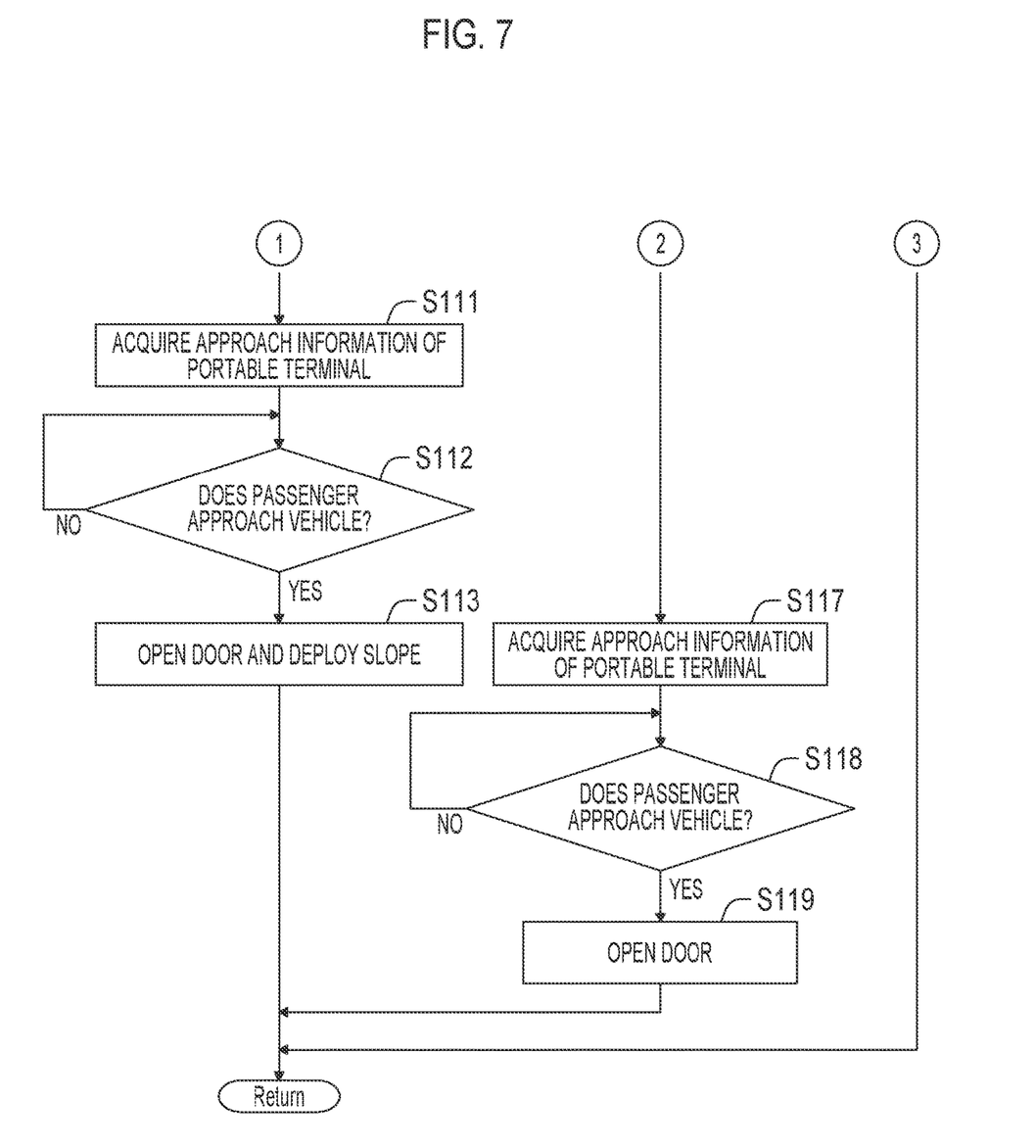
FIG. 7 is a flowchart showing a continuation of the flowchart shown in FIG. 6.

Moreover, as shown in step S112 of FIG. 7, the CPU 32 determines whether or not the passenger 70 approaches the vehicle 10 based on the approach information from the portable terminal 60. In a case where the determination is made as YES in step S112 of FIG. 7, the CPU 32 proceeds to step S113 of FIG. 7, and outputs a command for opening the door 12 and a command for deploying the slope 22 to the door device 11 and the slope device 21. As shown in FIGS. 2 and 3, the door device 11 opens the door 12 by this command. In addition, the slope device 21 deploys the slope 22 toward the sidewalk 82 by this command. The passenger 70 gets on the floor 103 of the vehicle cabin 102 of the vehicle 10 through the slope 22 from the sidewalk 82 while sitting on the wheelchair 71.

On the other hand, in a case where use of the wheelchair 71 by the passenger 70 is registered, but as a result of the image analysis, the determination is made that the wheelchair 71 is not actually used, the CPU 32 determines that deployment of the slope 22 is not needed. Moreover, the CPU 32 makes the determination as NO in S110 of FIG. 6 and proceeds to step S117 of FIG. 7 to acquire the approach information of the portable terminal 60. Moreover, the CPU 32 proceeds to step S118 of FIG. 7, and determines whether or not the passenger 70 approaches the vehicle 10. In a case where the determination is made as YES in step S118 of FIG. 7, the CPU 32 proceeds to step S119 of FIG. 7 and outputs the command for opening the door 12 to the door device 11 to open the door 12. In this case, the CPU 32 does not output the command for deploying the slope 22 to the slope device 21, and the slope 22 is not deployed.

In addition, in a case where non-use of the wheelchair 71 by the passenger 70 is registered, the CPU 32 of the door and slope control device 31 makes the determination as NO in step S107 in FIG. 6, proceeds to steps S114, S115, S116 of FIG. 6, captures the image of the passenger 70 by the camera 27, performs the image analysis, and confirms whether or not the passenger 70 uses the wheelchair 71 as in steps S108, S109, S110 of FIG. 6.

In a case where the determination is made that the passenger 70 does not use the wheelchair 71 as registered in the getting-on reservation, the CPU 32 confirms the attribute information of the passenger 70 that the wheelchair 71 is not used, and determines that deployment of the slope 22 is not needed. Moreover, the CPU 32 makes the determination as NO in step S116 of FIG. 6, proceeds to step S117 of FIG. 7, acquires the approach information of the portable terminal 60 in step S117, determines the approach of the passenger 70 in step S118, and outputs the command for opening the door 12 to the door device 11 in step S119. In this case, the CPU 32 does not output the command for deploying the slope 22 to the slope device 21, and the slope 22 is not deployed.

In addition, in a case where non-use of the wheelchair 71 by the passenger 70 is registered, but as a result of the image analysis, the determination is made that the wheelchair 71 is actually used, the CPU 32 determines that deployment of the slope 22 is needed. Moreover, the CPU 32 makes the determination as YES in S116 of FIG. 6, executes steps S111, S112, S113 of FIG. 7, outputs the command for opening the door 12 and the command for deploying the slope 22 to the door device 11 and the slope device 21, and deploys the slope 22 while opening the door 12.

As described above, the vehicle operation system 100 according to the embodiment confirms whether or not the passenger 70 is the passenger who makes the getting-on reservation based on the registered portable terminal information registered when the passenger 70 makes the getting-on reservation, determines the necessity of deployment of the slope 22 based on the attribute information of the passenger 70 registered when the getting-on reservation is made and the image captured by the camera 27, so that it is possible to surely perform deployment of the slope 22 by autonomous control of the vehicle 10. Therefore, even in a case where the vehicle 10 is driven by fully autonomous driving without a driver or an operator, it is possible to take a getting-on mode depending on the passenger 70.

In addition, in a case where the vehicle 10 is operated by autonomous driving as a shared bus, the slope 22 is deployed solely when the passenger 70 who needs deployment of the slope 22 gets on and off, so that it is possible to shorten a stop time and to increase the operation speed. Further, since opening of the door 12 and deployment of the slope 22 are performed at the timing when the passenger 70 approaches the vehicle 10, a feeling of hospitality can be produced.

In the above description, the description has been made on assumption that the necessity of deployment of the slope 22 is determined based on the information on use or non-use of the wheelchair 71 by the passenger 70 registered as the attribute information when the getting-on reservation is made and the image captured by the camera 27, but the present disclosure is not limited thereto. For example, the voice guide of a current position or a movement direction may be performed in accordance with a getting-on operation of the passenger 70 based on the information on the necessity of voice guide of the passenger 70 registered as the attribute information when the getting-on reservation is made and the image captured by the camera 27. In this case, the feeling of hospitality can be effectively produced.

In addition, in the above, the description has been made on assumption that the vehicle 10 is the electric vehicle capable of autonomously traveling by autonomous driving, but the vehicle 10 may be an electric vehicle driven by a driver or an operator, or an engine-driven vehicle. In addition, the vehicle 10 may be operated as a shared bus or a taxi. In addition, in the above, the description has been made on assumption that the door and slope control device 31 and the travel control device 41 are separate control devices, but the present disclosure is not limited thereto, and one control device may perform the controls of the door device 11 and the slope device 21 and the travel control of the vehicle 10.

What is claimed is:

1. A vehicle comprising:
a slope device configured to perform deployment and storage of a slope that forms a getting on-and-off passage of a passenger;
an imaging device configured to capture a status of the passenger before getting on the vehicle; and
a control device configured to communicate with a server including a getting-on reservation database including attribute information of the passenger, the attribute information includes necessity of voice guidance for the passenger, and perform deployment and storage of the slope by the slope device,
wherein the control device is configured to, when the vehicle is stopped to allow the passenger to get on the vehicle, confirm the attribute information of the passenger acquired from the getting-on reservation database of the server based on an image of the passenger before getting on the vehicle captured by the imaging device, and perform deployment of the slope depending on the confirmed attribute information.

2. The vehicle according to claim 1, wherein:
the attribute information of the passenger acquired from the getting-on reservation database includes information on use or non-use of a wheelchair when the passenger gets on the vehicle; and
the control device is configured to confirm the information on use or non-use of the wheelchair when the passenger gets on the vehicle acquired from the getting-on reservation database based on the image of the passenger before getting on the vehicle captured by the imaging device, and perform deployment of the slope depending on the confirmed information on use or non-use of the wheelchair when the passenger gets on the vehicle.

3. The vehicle according to claim 1, wherein:
the control device is configured to communicate with a portable terminal carried by the passenger when the passenger gets on the vehicle;
the attribute information of the passenger acquired from the getting-on reservation database includes information on a registered portable terminal registered in the getting-on reservation database by the passenger; and
the control device is configured to confirm whether or not the passenger is the passenger who makes a getting-on reservation based on information on the portable terminal acquired from the portable terminal carried by the passenger, and the information on the registered portable terminal of the passenger acquired from the getting-on reservation database.

4. The vehicle according to claim 3, wherein the control device is configured to perform deployment of the slope based on approach information of the portable terminal acquired from the portable terminal carried by the passenger.

5. A vehicle operation system comprising:
a vehicle on which a passenger gets, the vehicle being configured to autonomously travel; and
a server including a getting-on reservation database including attribute information of the passenger including necessity of voice guidance for the passenger, wherein:
the vehicle includes a slope device configured to perform deployment and storage of a slope that forms a getting on-and-off passage of a passenger, an imaging device configured to capture a status of the passenger before getting on the vehicle, and a control device configured to communicate with a server including a getting-on reservation database including attribute information of the passenger, and perform deployment and storage of the slope by the slope device; and
the control device is configured to, when the vehicle is stopped to allow the passenger to get on the vehicle, confirm the attribute information of the passenger acquired from the getting-on reservation database of the server based on an image of the passenger before getting on the vehicle captured by the imaging device, and perform deployment of the slope depending on the confirmed attribute information.

6. The vehicle operation system according to claim 5, wherein:
the attribute information of the passenger stored in the getting-on reservation database includes information on use or non-use of a wheelchair when the passenger gets on the vehicle; and the control device is configured to confirm the information on use or non-use of the wheelchair when the passenger gets on the vehicle acquired from the getting-on reservation database of the server based on the image of the passenger before getting on the vehicle captured by the imaging device, and perform deployment of the slope depending on the confirmed information on use or non-use of the wheelchair when the passenger gets on the vehicle.

7. The vehicle operation system according to claim 5, further comprising a portable terminal carried by the passenger when the passenger gets on the vehicle, wherein:

the control device is configured to communicate with a portable terminal carried by the passenger when the passenger gets on the vehicle;

the attribute information of the passenger stored in the getting-on reservation database includes information on a registered portable terminal registered in the getting-on reservation database by the passenger; and the control device is configured to confirm whether or not the passenger is the passenger who makes a getting-on reservation based on information on the portable terminal acquired from the portable terminal carried by the passenger, and the information on the registered portable terminal of the passenger acquired from the getting-on reservation database.

8. The vehicle operation system according to claim 7, wherein the control device is configured to perform deployment of the slope based on approach information of the portable terminal acquired from the portable terminal carried by the passenger.

9. The vehicle according to claim 1, wherein when there is a necessity for voice guidance for the passenger, the voice guidance for the passenger includes a movement direction to be performed in accordance with a getting-on operation of the passenger.

10. The vehicle operation system according to claim 5, wherein when there is a necessity for voice guidance for the passenger, the voice guidance for the passenger includes a movement direction to be performed in accordance with a getting-on operation of the passenger.

11. A vehicle comprising:

a slope device configured to perform deployment and storage of a slope that forms a getting on-and-off passage of a passenger;

an imaging device configured to capture a status of the passenger before getting on the vehicle; and a control device configured to:

communicate with a server including a getting-on reservation database including attribute information of the passenger, the attribute information of the passenger acquired from the getting-on reservation database includes information on use or non-use of a wheelchair when the passenger gets on the vehicle;

when the vehicle is stopped to allow the passenger to get on the vehicle, confirm the use or non-use of the wheelchair when the passenger gets on the vehicle acquired from the getting-on reservation database of the server based on an image of the passenger before getting on the vehicle captured by the imaging device;

when use of the wheelchair when the passenger gets on the vehicle is confirmed based on the image of the passenger before getting on the vehicle, perform deployment of the slope; and when non-use of the wheelchair when the passenger gets on the vehicle is confirmed based on the image of the passenger before getting on the vehicle, not to perform deployment of the slope.

12. The vehicle according to claim 11, wherein:

the control device is configured to communicate with a portable terminal carried by the passenger when the passenger gets on the vehicle;

the attribute information of the passenger acquired from the getting-on reservation database includes information on a registered portable terminal registered in the getting-on reservation database by the passenger; and the control device is configured to confirm whether or not the passenger is the passenger who makes a getting-on reservation based on information on the portable terminal acquired from the portable terminal carried by the passenger, and the information on the registered portable terminal of the passenger acquired from the getting-on reservation database.

* * * * *